Figure 1:
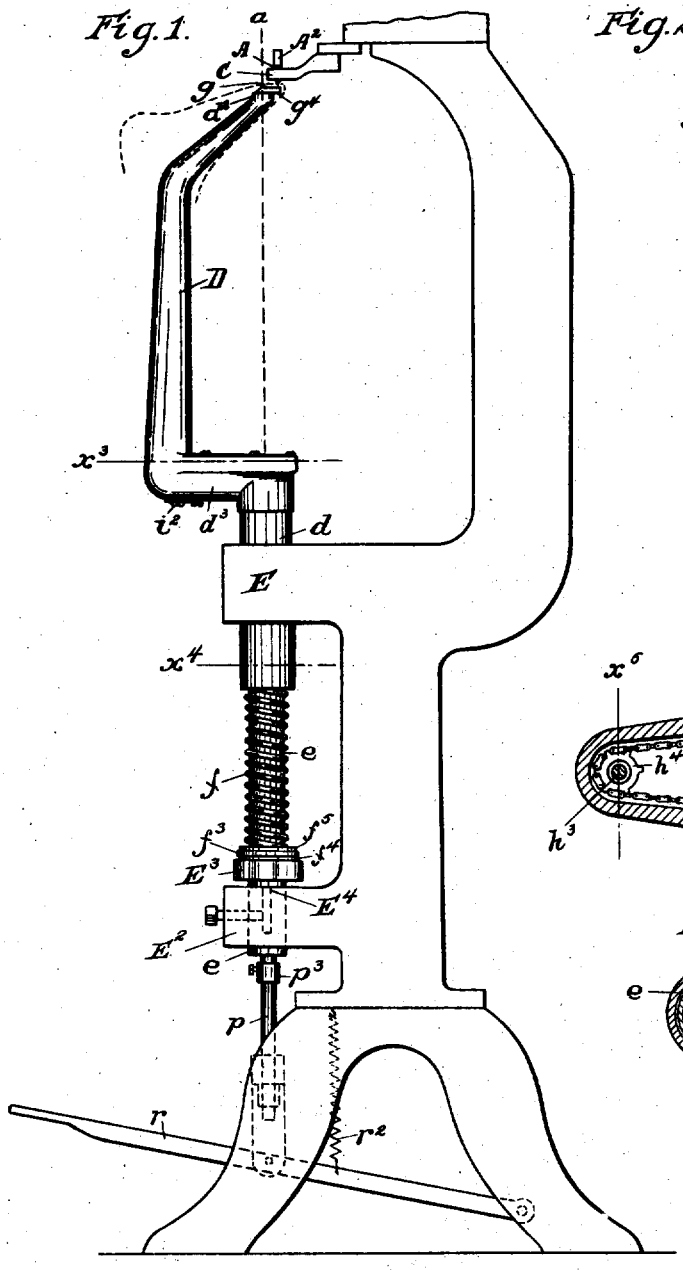

No. 12,618. REISSUED MAR. 19, 1907.

W. W. KELLY.

PEGGING MACHINE.

APPLICATION FILED FEB. 12, 1907.

2 SHEETS—SHEET 1.

Witnesses.
Elizabeth C. Coupe
Bertha H. Hathaway

Inventor:
William W. Kelly
By his Attorneys,
Nelson W. Rowland

THE NORRIS PETERS CO., WASHINGTON, D. C.

No. 12,618. REISSUED MAR. 19, 1907.

W. W. KELLY.

PEGGING MACHINE.

APPLICATION FILED FEB. 12, 1907.

2 SHEETS—SHEET 2.

Witnesses.
Elizabeth C. Coufe
Bertha H. Hathaway

Inventor.
William W. Kelly
By his Attorney,
Valant H. Howard

THE NORRIS PETERS CO., WASHINGTON, D. C.

UNITED STATES PATENT OFFICE.

WILLIAM W. KELLY, OF HARTLAND, VERMONT, ASSIGNOR, BY MESNE ASSIGNMENTS, TO UNITED SHOE MACHINERY COMPANY, A CORPORATION OF NEW JERSEY.

PEGGING-MACHINE.

No. 12,618. Specification of Reissued Letters Patent. Reissued Mar. 19, 1907.

Original No. 559,532, dated May 5, 1896. Application for reissue filed February 12, 1907. Serial No. 357,110.

*To all whom it may concern:*

Be it known that I, WILLIAM W. KELLY, a citizen of the United States, residing at Hartland, in the county of Windsor and State of Vermont, and formerly a resident of Spencer, county of Worcester, and Commonwealth of Massachusetts, have invented new and useful Improvements in Pegging-Machines, of which the following is a specification.

My invention is embodied in a pegging-machine for boots and shoes, and relates especially to the horn or supporting-anvil at the inside of the boot or shoe being pegged.

Until recently it has been the common, if not substantially universal, practice to peg the soles of boots or shoes while on the last, and although there are important advantages in the plan of pegging on a horn or work-support after the last is drawn there are difficulties which until recently have precluded the introduction of machines for pegging shoes while off the last.

The object of the present invention is to provide, in combination with the peg-driving mechanism or pegger proper of a pegging-machine, a horn or work-support to enter the shoe and support the insole at the point where the material is pierced and the peg driven, said horn or work-support being adapted to reach all parts of the sole at which the fastenings are to be driven.

In all pegging-machines heretofore devised, so far as is known to me, the axis of rotation of the horn is substantially in line with the awl and lies in the line of feed or plane through the awl and driver, both of which operate within the area of the supporting end of the rotating horn.

In the present invention the horn is supported with its axis offset from the plane through the awl and driver of the pegger, so that said awl and driver may operate at points outside of the area of the tip of the rotating horn. In order to provide a support for the material close to the point at which the awl and peg pass through the same, the said horn is provided with a work-support or anvil-piece pivotally supported in the tip of the horn coaxial with the axis of rotation of the horn itself and combined with gearing by which the said anvil is restrained from rotation with the horn as the latter is turned in presenting different parts of the sole to the pegger. The said anvil overhangs or projects beyond a portion of the periphery of the horn-tip and by reason of the gearing just mentioned always remains in the same position with relation to the pegger whatever may be the position of the horn. Thus when the horn inclines forward toward the pegger, as is the case in pegging around the toe end of a boot or shoe, the anvil-piece constitutes substantially a lateral extension of the horn-tip, which readily enters between the insole and upper and reaches to the edge of the insole, while in the reversed position of the horn with relation to the pegger, assumed when turning the horn while pegging in the shank, the anvil-piece overhangs the horn and enables the pegging to be performed near the edge of the insole with less stretching or straining of the upper than could be accomplished if the pegging were directly over the end of the horn-tip instead of at a point offset laterally with relation thereto.

The invention further consists in novel features of construction of the horn and means for supporting and operating the same by which the manipulation of the horn is facilitated and the quality of the work produced by the pegging-machine improved.

Figure 2:
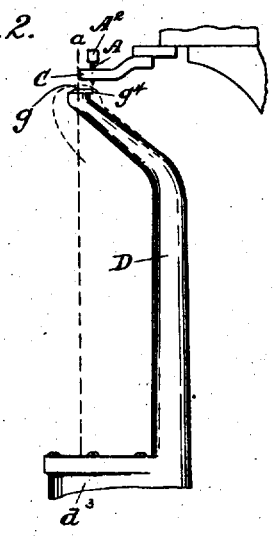
Figure 3:
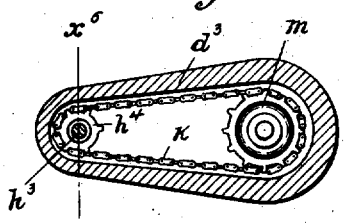
Figure 4:
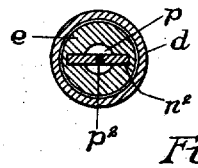
Figure 5:
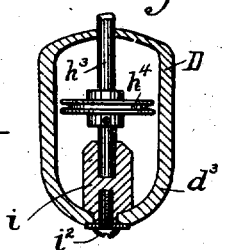
Figure 6:
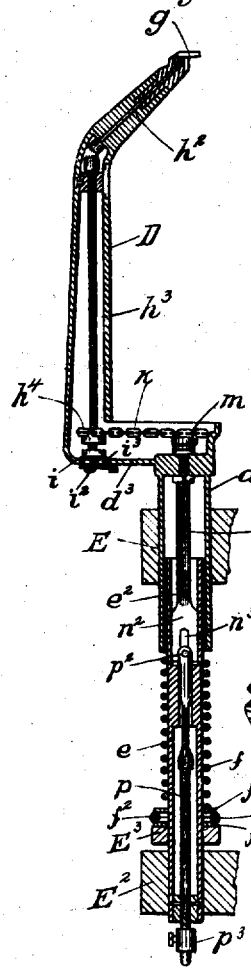
Figure 7:
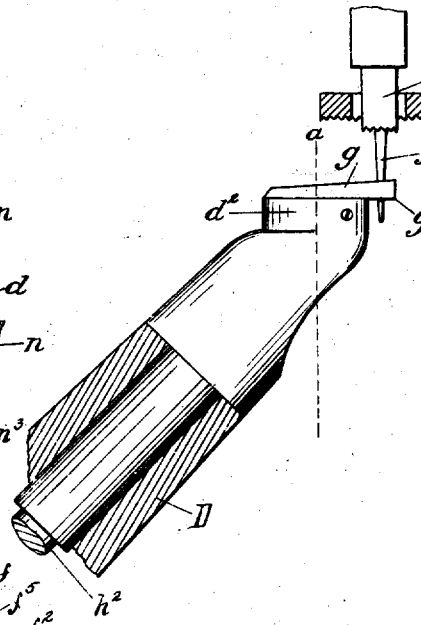
Figure 8:
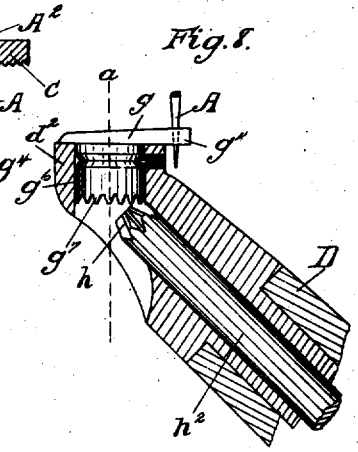
Figure 9:
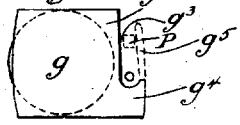
Figure 10:
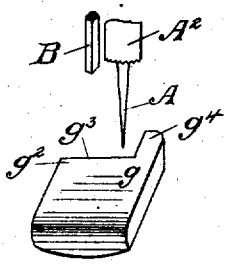
Figure 11:
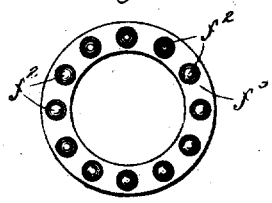
Figure 12:
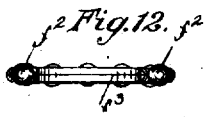

Figure 1 is a side elevation of the pegging-machine embodying this invention, the main portion of the mechanism for driving pegs and feeding the material being omitted and the horn being in the position assumed while pegging around the toe end. Fig. 2 is a similar view showing the relation of the horn-tip and anvil-piece to the awl of the pegger when the horn is being turned or reversed while pegging in the shank portion of the boot or shoe; Fig. 3, an enlarged sectional plan on the plane indicated at $x^3$, Fig. 1; Fig. 4, an enlarged horizontal section on the plane indicated at $x^4$, Fig. 1; Fig. 5, an enlarged vertical sectional detail on line $x^5$, Fig. 3; Fig. 6, a longitudinal section through the horn and its support; Fig. 7, a detail showing the horn-tip and anvil-piece in side elevation in their working relation to the awl; Fig. 8, a similar view showing the horn-tip in longitudinal section and in reversed position with relation to that shown in Fig. 7, the anvil-piece being shown in elevation; Fig. 9, a plan view of the anvil-piece detached; Fig. 10, a detail showing in perspective the anvil-piece and the awl and driver of the peg-driving mechanism, and Figs. 11 and 12 details of the bearing for the rotatable horn and its spring.

The mechanism for driving pegs may be of any suitable or usual construction, of which only the awl A and driver B (see Fig. 10) and the presser-foot or upper member C (see Figs. 1, 2, and 7) of the work-clamp are shown to indicate the relation thereof to the horn or work-support.

The specific construction of the peg-driving mechanism, which for convenience will be referred to as the "pegger," is not material to the present invention, which consists, mainly, in the construction of the horn and in the combination of said horn with the awl and driver of the pegger in the operative relation thereto hereinafter explained.

The horn proper, D, which enters the boot or shoe, may be of any suitable or usual construction and as herein shown has a shank portion *d*, capable of rotation in a bearing E on the main frame of the machine and also capable of longitudinal movement therein with relation to a post *e*, fixed in a bracket or arm $E^2$ of the main frame. The shank *d* of the horn has a telescopic movement on said post *e* and is pressed upward by a spring *f*, which causes the upper end of the horn, or rather the anvil-piece supported therein, to press against the work, so as to clamp the same between it and the foot C of the pegger, except during the feed movement, in the usual manner. The horn D is thus capable of rotation about the axis of the post *e* in the bearing E and in accordance with the present invention is so located with relation to the pegger that the axis of rotation of the horn (indicated by the dotted line *a*, Figs. 1, 2, 7, and 8) is offset with relation to the awl and driver of the pegger at right angles to the line of feed of the material being pegged. In the operation of pegging the awl descends to pierce the material and is then withdrawn, and the peg is then driven in the awl-hole thus formed, the material being fed between the successive peg-driving operations in the direction of the plane through the axis of the awl and driver.

In accordance with the present invention the horn is so located that the axis of rotation of the horn is set to one side of the plane through the awl and driver, or, in other words, to one side of the line of feed of the material along which the pegs are driven, being shown as so located that the awl and driver descend outside of the area of the upper end of the horn-tip $d^2$.

In order that the material may be supported close to the point at which the awl pierces it and at which the peg is driven, the horn is provded with an anvil-piece *g*, pivotally supported in the horn-tip and overhanging or projecting beyond the periphery thereof, as shown at $g^2$, Fig. 9, in which the periphery of the horn-tip is indicated by dotted line. Said anvil-piece is restrained from rotation with the horn and is thus always retained in the same position with relation to the awl and driver of the pegger regardless of the rotation of the horn to facilitate the presentation of different parts of the sole to the pegging mechanism in the pegging operation. The overhanging portion or head $g^2$ of the anvil-piece, which thus always projects from the horn-tip to a position beneath the awl and driver of the pegger, is properly constructed to support the material close to the points at which the awl penetrates and at which the peg is driven.

As shown in Figs. 9 and 10, the said projecting portion has a substantially straight edge $g^3$ parallel with the line of feed and close to the point at which the awl and peg penetrate the material, so as to afford a suitable anvil or support to the material while being penetrated. In order to further support the material at the point where the awl penetrates, said anvil-piece is provided with a lateral projection $g^4$, which thus supports the material at the rear as well as at the side of the awl, and said projection $g^4$ may, if desired, be extended to form a finger, as shown in dotted lines at $g^5$, Fig. 9, so as to support the material at three sides of the point penetrated by the awl and at both sides of the points penetrated by the peg, (indicated at P, Fig. 9.)

Rotating horns to afford a support at the inside of the boot or shoe while operations are being performed upon the sole thereof have been heretofore made wherein the horn is provided with a tip or anvil-piece which is prevented from rotating with the horn in order to maintain it in definite relation to devices that operate from above and through the sole, and gearing or connections of the kind heretofore used to restrain such anvil from rotation may be employed in the present invention to hold the anvil-piece *g* against rotation with the horn. As herein shown, the said anvil-piece is provided with a substantially cylindrical stem or pivotal shank $g^6$, having its bearing in a socket formed in the tip $d^2$ of the horn coaxial with the axis of rotation of the horn, and said shank $g^6$ is provided with gear-teeth $g^7$, coöperating with teeth *h*, constituting a pinion at the end of a shaft $h^2$, turning in bearings in the horn and connected to rotate with a shaft $h^3$ in the upright or substantially vertical part of the horn. The said shaft $h^3$ is stepped in the bearing *i* in the angle of the horn and is provided with a sprocket-wheel $h^4$, connected by a chain *k* with a sprocket-wheel *m*, fixed upon a shaft *n*, extending through the shank *d* of the horn. The said shaft *n* is provided with a flattened portion $n^2$, which enters a corresponding flattened socket $e^2$ in the post

*e*, which, as before stated, has no rotary movement, and thus restrains the said shaft *n* and sprocket-wheel *m* from rotating when the horn is turned about its axis. The gearing between the said sprocket *m* and the anvil-piece *g* prevents the latter from rotating as the horn turns, so that the anvil-piece *g*, except for up-and-down movement, is practically stationary with relation to the awl and driver of the pegger, although the horn may be turned freely, as is required in presenting different parts of the edge of the sole to the pegger. The shaft *n* is connected by a rod or link *p* with a treadle *r*, depression of which thus lowers the horn with relation to the foot C of the pegger to enable the work to be positioned beneath the awl and driver of the pegger, after which when pressure on the treadle is removed, the spring *f* presses the horn upward, so as to clamp the work between the anvil-piece and foot C except during the feed, which in the case of an awl-feed machine is performed by the awl penetrating the material and the awl-stock $A^2$, Fig. 7, depressing the material slightly below and out of engagement with the foot C, after which it moves the material along the top of the anvil-piece before the awl is withdrawn.

As shown in Figs. 7 and 8, the feed of the material is at right angles to the plane of projection, or directly away from the person facing the machine, as shown in said figures. By having the axis of the horn offset with relation to the line of feed or plane of the awl and driver of the pegger, as shown, it will be seen that the said anvil-piece constitutes practically an extension of the horn when the latter is in such position that its upper end inclines toward the pegger—as shown, for example, in Fig. 1—thus enabling the anvil to reach more readily into the toe of the boot, which is indicated in dotted lines in said figure, while in the reversed position, where the horn stands for the most part at the rear of the awl and driver of the pegger and projects forward and upward toward the same, as in Fig. 2, the pegging operation is performed at some distance back from the tip, the amount of projection of the anvil-piece being practically deducted from the length of the horn, thus enabling the latter to be more easily turned or reversed and with less strain upon the upper than would be the case if the pegging were done directly over the end of the horn. While the turning of the horn depends to a greater or less extent upon the practice of the individual operator, it is commonly turned for a short time to substantially the position shown in Fig. 2 while pegging in the shank, although it is kept in about the position with relation to the peg-driving mechanism shown in Fig. 1 while pegging around the toe and heel ends.

By reason of the hereinbefore-described construction of the horn it will be seen that only the horn proper, D, (including the tubular shank *d*, the lateral arm $d^3$ therefrom, and the part that extends upward and diagonally from said arm to the tip, which is directly over the axis of said shank *d*,) is depressed against the force of the spring *f* at each feed operation of the machine and is caused to rise by the force of said spring *f* between the feed operations to clamp the work between the horn and the foot C of the pegger. This construction and the operative effect on the material resulting therefrom is of great advantage over that in which the pivotal shank of the horn is extended through the lower bearing at $E^2$ and connected with the treadle, so that the entire mass of the horn and its shank and the connections to and including the treadle have to be depressed by the awl-stock $A^2$ at each feed operation, since in the latter case the inertia of the entire mass has to be overcome when the awl-stock strikes upon the sole, and thus brings severe pressure upon the sole, tending to indent and mar it and causing objectionable disfigurement, especially when the material is soft. By having the horn-shank *d* tubular, as herein shown, and moved telescopically with relation to the post *e* only slightly more than the mass of the horn proper has to be depressed by the awl-stock in the feed operation. The link or connecting-rod *p*, extending from the treadle *r* to the shaft *n* of the connections or gearing by which the anvil-piece *g* is held against rotation with the horn, is connected with said shaft *n* by a cross-pin $p^2$, working in a slot $n^3$ in the flattened portion $n^2$ of the shaft *n*. Said connecting-rod *p* is also provided with a stop $p^3$, which may be adjustable thereon and which by its engagement with the lower end of the fixed post *e* limits the upward movement of the horn under the pressure of the spring *f*, so that the anvil-piece will not strike upon the foot C of the pegger when no material is interposed between the two. The depression of the treadle *r* will then pull down the horn proper, D, from the foot C to facilitate the introduction of the work between the horn and foot, and when the treadle *r* is released it will be raised, as by a light spring $r^2$, (see Fig. 1,) until the stop $p^3$ engages with the lower end of the post *e*, the loose or slotted connection at $p^2$ $n^3$ permitting the treadle to thus rise independently of the horn and also permitting the vibrating up-and-down movement of the horn involved in the feed operation of the material to take place without vibrating the treadle and connecting-rod *p*. Thus the material in the horn, the inertia of which has to be overcome at each descent of the awl in an awl-feed, machine is greatly reduced, and the consequent marring of the material by the blow of the end of the awl-stock $A^2$ thereon is substantially obviated.

These last-described features of construction of the horn are not dependent upon the specific character of the gearing between the shaft $n$ and the anvil-piece $g$, which might be of any suitable construction, that herein shown, however, comprising the sprocket-and-chain connection between the shafts $n$ and $h^3$, being believed to be the best. The step-bearing $i$ of the shaft $h^3$ is secured by a screw or bolt $i^2$ in a slot $i^3$ lengthwise of the horizontal portion $d^3$ of the horn, thus enabling the lower end of the shaft $h^3$ and the sprocket thereon to be adjusted toward the non-rotating sprocket $m$ on the shaft $n$ to make the chain work properly without sufficient lost motion to permit the anvil-piece $g$ to get out of its proper relation to the awl and driver of the pegging mechanism.

In order to enable the horn to rotate freely while subjected to the pressure of the spring $f$, an antifriction-bearing is interposed between one end of the said spring and the part against which its pressure is exerted. As herein shown, the antifriction-bearing is at the lower end of the spring, between it and a yoke $E^3$, which sustains the pressure of the lower end of the spring. Said bearing comprises a series of balls $f^2$, contained in a ring or collar $f^3$, slightly thinner than the diameter of the balls, the surfaces of which thus project slightly from the upper and lower faces of said collar and bear against washers $f^4$ $f^5$, interposed between them and the bearing-yoke $E^3$ and end of the spring $f$, respectively. Said yoke $E^3$ is supported upon rods $E^4$, (see Fig. 1,) entering recesses in the bearing-bracket $E^2$, in which they may be fastened, as by set-screws, thus enabling the said yoke to be adjusted up and down to properly regulate the tension of the spring $f$.

By having the axis of the horn offset from the line of feed, so that the awl and driver operate outside of the periphery of or area occupied by the upper end of the horn-tip, there is nothing to interfere with the descent of the awl-point below the level of the insole or to limit the length of peg used, as the projecting ends of the pegs at the inside of the shoe pass freely by the horn-tip along the side of the supporting edge of the anvil-piece.

The invention so far as it relates to the offsetting of the horn with relation to the line of feed is not limited to the construction wherein the horn is so far offset that the awl and driver operate outside of the periphery of the upper end of the horn-tip or to the construction wherein the horn-tip is provided with an anvil-piece pivotally supported therein and combined with means for holding said anvil-piece against rotation when the horn is turned, as the said arrangement of the horn with relation to the awl and driver as set forth is of advantage, even though the awl or driver, or both, do not operate wholly outside of the periphery of the horn-tip, the said offsetting enabling the fastenings to be effectively driven nearer the edge of the sole than is the case when the plane of the awl and driver coincides with the axis of rotation of the horn, as heretofore.

Having described my invention, what I claim as new, and desire to secure by Letters Patent of the United States, is—

1. The combination of the awl and peg-driving mechanism of a pegging-machine, with a rotatable horn presenting an effective support for the material between the point penetrated by the awl and the axis of rotation of the horn, the axis of rotation of the horn being offset with relation to the line of feed of the awl, which awl operates outside the exterior surface of said support, substantially as described.

2. The combination of the awl and peg-driving mechanism of a pegging-machine, with a rotatable horn the axis of rotation of which is offset with relation to the line of feed of the awl, and means for presenting an effective support for the material close to the point penetrated by the awl between the axis of rotation of the horn and the point of penetration of the awl, and an additional support beyond said point of penetration forming a bottomless working space for the awl between said supports.

3. The combination of the peg-driving mechanism of a pegging-machine, with a rotatable horn, the axis of rotation of which is offset with relation to the line of feed of the peg-driving mechanism, and an anvil-piece pivotally supported in the tip of said horn to support the material between the point penetrated by the awl and the axis of rotation of the horn, the awl operating on a tangent outside the periphery of said anvil-piece, substantially as described.

4. The combination of the peg-driving mechanism of a pegging-machine, with a rotatable horn, the axis of rotation of which is offset with relation to the line of feed of the peg-driving mechanism, and an anvil-piece pivotally supported in the tip of said horn to support the material between the point penetrated by the awl and the axis of rotation of the horn, the awl operating on a tangent outside the periphery of said anvil-piece, and means for holding said anvil-piece against rotation with the horn, substantially as described.

5. The combination with the awl and peg-driving mechanism of a pegging-machine, of a horn presenting a work-support between its axis of movement and the line of feed movement of the awl, such line of feed of the awl being offset with relation to the axis of the horn and the awl being arranged to work at the side of said support.

6. The combination of the rotatable horn, with an anvil-piece supported in the tip thereof, and projecting laterally beyond said horn-tip to afford a support for the material, and means for holding said anvil against rotation with the horn, substantially as described.

7. The combination of the peg-driving mechanism comprising an awl and peg-driver, with a rotatable horn, the axis of rotation of which is offset with relation to the said awl and driver, which operate outside the periphery of the tip of said horn, and an anvil-piece supported in said horn-tip, and projecting over the periphery thereof toward the awl and driver, and means for holding said anvil-piece against rotation with the horn, substantially as described.

8. The herein-described anvil-piece for the horn of a pegging-machine comprising a pivotal shank and an overhanging head or supporting portion, having a lateral projection at one end thereof, substantially as described.

9. The combination of the rotatable horn, with a sprocket-wheel held against rotation in the axis of the horn, a second sprocket-wheel having its bearing in the rotating horn and a chain connecting said sprocket-wheels, an anvil-piece pivotally supported in the horn-tip and connection between the same and said sprocket-wheel and horn, substantially as and for the purpose described.

10. The combination with the rotatable horn and means for yieldingly pressing it upward, of a treadle and means for yieldingly pressing it upward, and a loose or slotted connection between said treadle and horn; said horn being movable downward independently of said treadle, substantially as described.

11. The combination of a rotatable horn with an anvil-piece supported in the tip thereof, gearing in said horn to prevent rotation of said anvil-piece therewith, and a shaft in the shank of said horn connected with said gearing; a fixed post below and in line with the said horn engaged with said shaft as described, whereby the latter can move longitudinally but without rotary movement in said post; substantially as and for the purpose set forth.

12. The combination of a rotatable horn, with a spring to press it upward; and an anti-friction-bearing for the end of said spring comprising a collar; a series of balls contained therein; and bearing-surfaces for said balls at each side of said collar, substantially as and for the purpose described.

13. The combination of the horn having a hollow or tubular shank, and an anvil-piece supported in the tip thereof, and gearing in said horn to prevent rotation of said anvil-piece therewith; a post fixed below and entering the tubular shank of said horn; a shaft in said horn connected with the gearing therein, and engaged with said post as described; a spring to elevate said horn and a treadle connected to a shaft in said horn and provided with a stop to limit the upward movement thereof, substantially as described.

In testimony whereof I have signed my name to the specification in the presence of two subscribing witnesses.

WILLIAM W. KELLY.

Witnesses:

ALONZO A. MARTIN,
ROBERT E. FRENCH.